(12) United States Patent
Bell et al.

(10) Patent No.: US 7,548,914 B2
(45) Date of Patent: Jun. 16, 2009

(54) SYSTEM AND METHOD FOR PROVIDING ACTIVE TAGS

(75) Inventors: Charles H. Bell, Seattle, WA (US); Jeffrey A. Holden, Seattle, WA (US); Ian W. Freed, Seattle, WA (US); Jeffrey P. Bezos, Greater Seattle, WA (US)

(73) Assignee: Amazon.com Inc., Seattle, WA (US)

( * ) Notice: Subject to any disclaimer, the term of this patent is extended or adjusted under 35 U.S.C. 154(b) by 349 days.

(21) Appl. No.: 11/501,443

(22) Filed: Aug. 9, 2006

(65) Prior Publication Data

US 2008/0065995 A1    Mar. 13, 2008

(51) Int. Cl.
*G06F 17/30* (2006.01)
(52) U.S. Cl. .......................................... 707/5; 707/102
(58) Field of Classification Search ................. 707/10, 707/104.1, 1–5, 102, 103 R, 200; 709/203
See application file for complete search history.

(56) References Cited

U.S. PATENT DOCUMENTS

| | | | |
|---|---|---|---|
| 6,557,015 B1 * | 4/2003 | Bates et al. | 715/229 |
| 6,892,181 B1 | 5/2005 | Megiddo et al. | |
| 6,928,616 B2 | 8/2005 | Drane et al. | |
| 2005/0114229 A1 * | 5/2005 | Ackley et al. | 705/26 |
| 2006/0155707 A1 * | 7/2006 | Marcjan | 707/10 |

OTHER PUBLICATIONS

PCT International Search Report dated Jul. 24, 2008, from corresponding PCT Application No. PCT/US07/75626, 2 pages.
"RefleX", entire website, retrieved on Jan. 7, 2009, <<http://reflex.gforge.inria.fr/faq.html#N8008E4>>, INRIA, 7 pages.
"Documentation—Tags", entire website, retrieved on Jan. 7, 2009 at <<http://spyce.sourceforge.net/docs/doc-tag.html>>, Spyce 2.1., 3 pages.

* cited by examiner

*Primary Examiner*—Cheryl Lewis
(74) *Attorney, Agent, or Firm*—Lee & Hayes, PLLC

(57) ABSTRACT

A computer-implemented data processing system includes tag logic for permitting a user to create an active tag. The active tag is associated with an object and includes configuration information that defines an action to be performed upon selection of the active tag. The configuration information is accessible by another user. The system also includes a user interface in communication with the tag logic for displaying the active tag.

68 Claims, 12 Drawing Sheets

Create Q&A Active Tag: Build Questionnaire

Tag Name: Digital Camera Selector

Text for Question 1: How much do you want to spend?

Text for Answer Selection A: Less than $100
Text for Answer Selection B: $100-$250
Text for Answer Selection C: $250-$750
Text for Answer Selection D: More than $750

[Add another answer selection] [Add another question] [Done with questions; Build action logic]

FIG. 9

Create Q&A Active Tag: Build Action Logic

Tag Name: Digital Camera Selector

Action Logic:

```
If Q1=A and Q2=A and Q3=A and (Q4=A or Q4=B);
    then show Product ID #1234
If Q1=A and Q2=A and Q3=A and (Q4=C or Q4=D);
    then show Product ID #2345
If Q1=A and Q2=B;
    then show Product ID #3456
If Q1=A and (Q2=C or Q2=D) and Q3=A and (Q4=A or Q4=B);
    then show Product ID #4567
If Q1=A and (Q2=C or Q2=D) and Q3=A and (Q4=C or Q4=D);
    then show Product ID #5678
If Q1=A and (Q2=C or Q2=D) and Q3=B and (Q4=C or Q4=D);
    then show Product ID #6789
```

FIG. 10

SYSTEM AND METHOD FOR PROVIDING ACTIVE TAGS

FIELD OF THE INVENTION

The present invention relates to the field of electronic data processing, and more specifically, to the field of network systems having tag services that utilize active tags within a network community.

BACKGROUND

Network systems such as the Internet provide users with access to large amounts of information. In order to allow network users to find and organize information on network systems that is relevant to specific subject matter topics, various techniques have been developed. One such technique involves the use of "tags" and network-based tag services.

A tag may be a word, a group of words, or a group of alphanumeric characters that may be assigned by a user to one or more objects (e.g., files, documents, web pages, items displayed via a network-based retail store, digital photographs, bookmarks, etc., or parts or components thereof). Tags are typically used to classify objects and search for objects. Often, though, tags are essentially passive in nature and may not provide any additional functionality beyond their usage in categorizing, searching for, etc., the objects to which the tags have been assigned.

Services for providing passive tags may be used in a variety of environments. For example, a passive tag service may be used as a part of a network-based retail operation, providing shoppers with the ability to tag specific objects such as items available for sale, web pages, etc. with a passive, textual descriptor. A passive tag service may also be used in conjunction with, for example, a database of newspaper articles so as to provide users with the ability to tag articles. The objects being tagged may be provided by the network system, or by users of the network system, or by another entity. The textual descriptor may then be used by the passive tag service, e.g., to classify the object to which the tag is assigned. Typically, the passive tags to be assigned to the object or objects are chosen by users of the network system.

Passive tags may be public or private in nature. If public, passive tags assigned by a user to an object may be viewed by other users within a user community. The community aspect of tags may allow a user to benefit from the tagging activities of others. However, because passive tags are merely used to further describe or identify an object of interest to the user who created the tag, the usefulness of passive tags is limited.

SUMMARY

One embodiment of the invention enables users within a community to create, use, and modify active tags. For example, a system is described that includes tag logic for permitting users to create an active tag. The active tag is associated with an object and includes configuration information that defines an action to be performed upon selection of the active tag. The system also includes a user interface in communication with the tag logic for displaying the active tag. Further, using such a system, users may copy and/or modify the active tags and the underlying configuration information to create additional active tags that may be used by others. The system may also collect and/or display active tags based on various criteria, and permit users to provide feedback regarding the active tags.

It should be understood that the detailed description and specific examples, while indicating various embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 9 is a sample user interface display of an active tag configuration template according to one embodiment;

FIG. 10 is a sample user interface display of an active tag configuration template according to one embodiment;

DETAILED DESCRIPTION

A system and method are provided for permitting users to mark objects with an active tag that not only identifies or describes the object in some way (like a passive tag), but also causes an action to be performed when the active tag is selected. For example, a user may mark a detail web page that offers for sale a green, women's shoe with an active tag that identifies the web page with the term "green shoe" and that includes configuration information (e.g., a script or code) for performing a search for matching accessories. Other users within a community may then use the features of such an active tag to their benefit. For example, users may modify and/or copy the underlying configuration information of an existing active tag to create new or modified active tags that suit their particular needs. Active tags may provide relatively simple, or relatively complex, functional features, depending on the sophistication of the user and how the active tag is configured. For purposes of the following description, any references to the term "tag" shall mean an "active tag" unless specifically stated otherwise.

Figure 1:
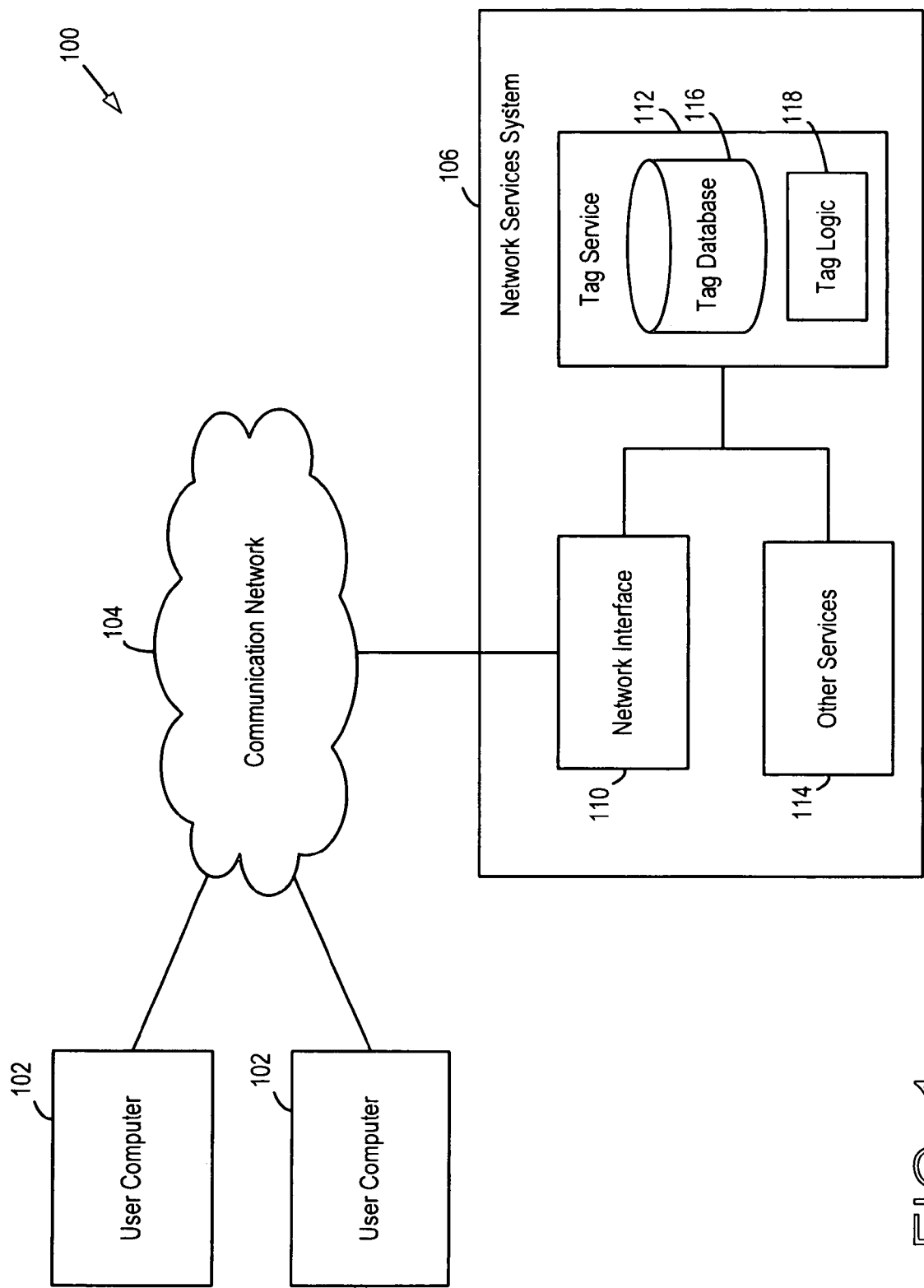
FIG. 1 is a schematic of a tag service according to one embodiment.

Referring to FIG. 1, a system 100 according to one embodiment is shown. System 100 includes one or more user computers 102 connected to network interface 110 by way of a communication network 104, such as the Internet. A network services system 106 may include network interface 110, tag service 112, and other services 114. Users are able to access network services system 106 and tag service 112 via user computers 102 and communication network 104. Tag service 112 includes tag database 116 and tag logic 118. Tag database 116 may store, or include, information associated with both passive and active tags assigned to various objects by users of tag service 112. Tag logic 118 is used to, among other things, permit users to create, modify, access, and enable/disable active tags provided by tag service 112. As shown in FIG. 1, tag logic 118 is a component of network services system 106. According to another embodiment, tag logic 118, or either the tag database 116 or tag logic 118, could be implemented on a client computing device, such as user computer 102.

Tag logic 118 may provide users with active tag features as part of tag service 112. Active tags are markers that may be assigned to various objects (e.g., retail items sold via a network-based retailer, digital photographs, web pages, network displays, documents, files, components thereof, and so on) in the same manner as passive tags (which merely describe or identify the objects to which they are assigned). However, active tags may also provide functionality that may be configured and accessed by users, and that may cause one or more actions (e.g., a network-based search) to be performed, depending on the configuration of the tag. An active tag may be configured so that the action is performed upon the selection of the active tag by a user or other application, or alternatively, so that the action is performed automatically, for example, upon a display of a page containing the active tag.

As will be described in more detail below, tag service 112 enables a user to, for example, create an active tag. Depending on the sophistication and preferences of the user, a wide variety of methods may be employed to allow the user to configure (e.g., program) an active tag, ranging from fill-in-the-blank type programming (where the user may enter only certain keywords that may be added to underlying code), to more traditional computer code scripting (where the user may enter most or all of the code itself). In addition, active tags may provide varying levels of sophistication in terms of the actions they cause to be performed. Upon selection of the active tag, tag logic 118 carries out the action defined by the configuration of the active tag.

According to one embodiment, users of tag service 112 may view, use, and/or modify active tags created and/or modified by other users. For example, a user may choose to create an active tag that causes a network-based search to be performed. The user may assign the active tag to, for example, a detail page for a retail product. Tag service 112 may display the active tag as part of the detail page, and subsequent users visiting the detail page may select the active tag and thereby cause the search defined by the active tag to be performed. Alternatively, subsequent users may modify the search parameters of the active tag to create a new version of the active tag that returns different search results when the active tag is selected.

According to another embodiment, tag service 112 may allow users to copy (e.g., "copy and paste," "drag and drop," etc.) active tags from one object to another (e.g., from one page to another), while maintaining the functionality of the active tag. For example, a user viewing a detail page for a first retail product may find one or more active tags displayed with the product to be particularly useful (e.g., an active tag used in searching for related products within a particular price range). The user may desire to utilize similar functionality with other products. Tag service 112 may permit the user to copy the active tag to additional product detail pages and provide functionality on the new pages similar to that provided on the original display. As an additional example, a user reading a network-based article may utilize an active tag to identify related articles, and the active tag may be copied to the related articles to create an iterative process to identify further related articles. It should be understood that while tag service 112 may permit users to create and/or modify, etc., active tags, tag service 112 also permits users to utilize active tags created by others without having to create and/or modify the configuration information of the active tag (e.g., users may utilize existing active tags without needing to provide any new or additional information for the active tags).

Figure 2:
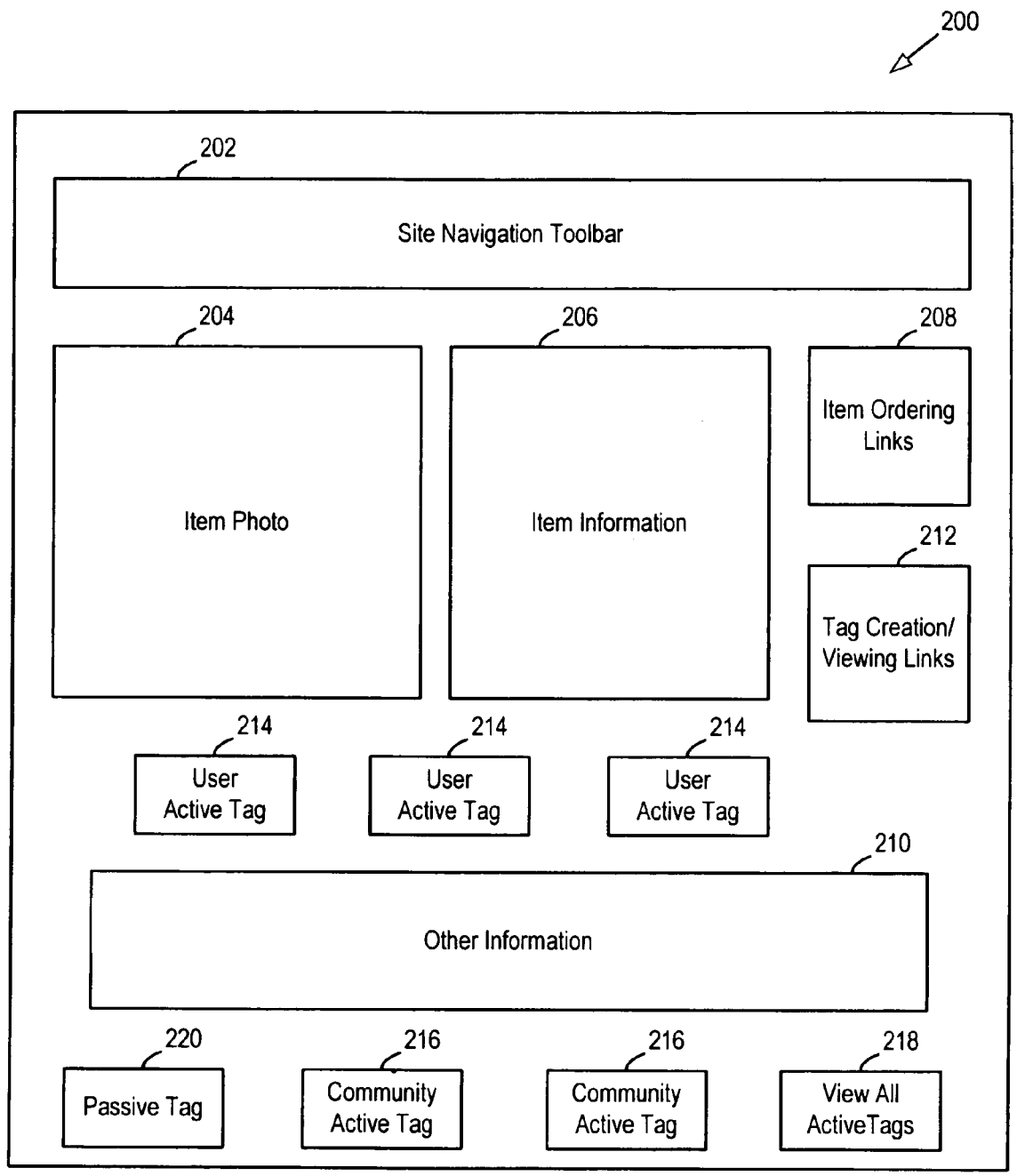
FIG. 2 is a sample user interface display of a web page containing active tags according to one embodiment.

Referring now to FIG. 2, a user interface display 200 for presenting active tags to a user according to one embodiment is shown. As shown in FIG. 2, display 200 may be, for example, a detail page for an item offered for sale by a network-based retail store, and include features such as a navigation toolbar 202, an item photo 204, item information 206, and item ordering links 208. Other information 210 related to the detail page may also be provided. While FIG. 2 illustrates a detail page for a network-based retailer, other types of displays related to various types of objects (e.g., articles, digital photographs, etc.) may be marked with active tags by users.

Referring further to FIG. 2, display 200 also contains several active tags at various locations within display 200. More specifically, display 200 may contain one or more user active tags 214 and/or one or more community active tags 216. User active tags 214 may be active tags created by the user (identified by tag service 112 via a login, registration, or other activity) viewing the current display. Community active tags 216 may be created by any of the users having access to display 200. According to one embodiment, the provider of tag service 112 may determine which active tags (e.g., user and/or community active tags) are to be displayed by utilizing one or more personalization or recommendation methods (e.g., by selecting active tags to be displayed based on feedback received regarding the active tags, community and/or individual user preferences and/or characteristics, attributes of the individual active tags, etc.), as also discussed in further detail with respect to FIGS. 14-16. The active tags may cause a variety of actions to be performed when selected, and may be located in any suitable location. For example, a user of tag service 112 may configure a "check-out" active tag configured to automatically purchase the item currently displayed to the user upon the user selecting (e.g., clicking on, hovering over, etc.) the active tag. Such an active tag may also be presented to subsequent users as part of display 200 (e.g., as one of the community active tags 216). As shown in FIG. 2, subsequent users, in addition to selecting the active tag with its existing functionality, may modify the active tag or copy the active tag to a different object (e.g., a display page containing a different item).

Figure 3:
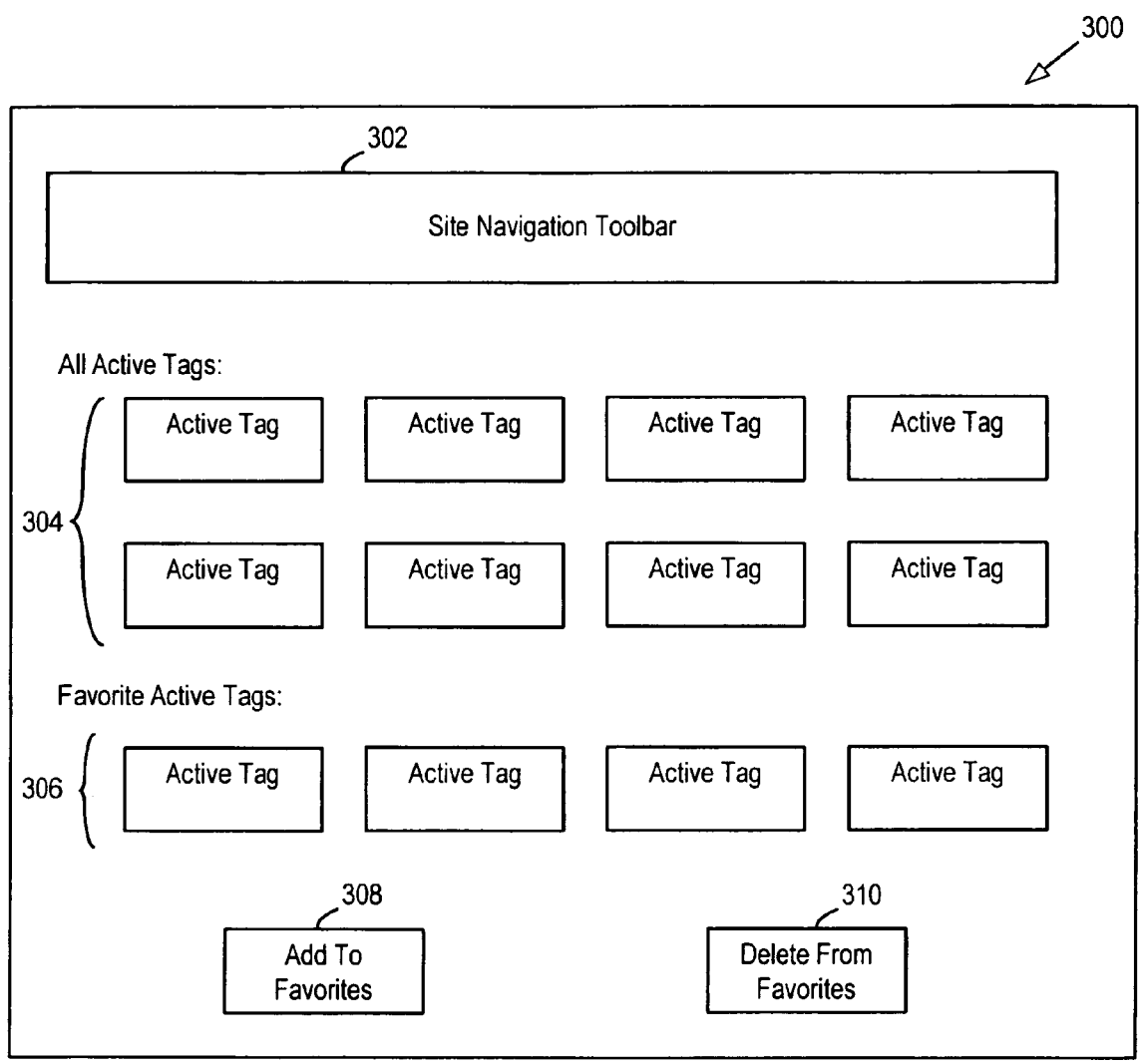
FIG. 3 is a sample user interface display of a web page containing a collection of active tags from a community of users according to one embodiment.

In addition to active tags, display 200 may include one or more passive tags, such as passive tag 220, which users may also select. For example, passive tag 220 may be a passive tag associated with an item shown in item photo 204. Upon a user selecting passive tag 220, tag service 112 may present the user with the complete list of items (including the item shown in item photo 204) with which passive tag 220 is associated. Further, display 200 may include option 218 ("View All Active Tags") that allows users to view all of the active and/or passive tags associated with the current object. If such option is selected, a collection of all of the active tags may be consolidated and displayed in a single location, such as display 300 shown in FIG. 3. In one embodiment, display 300 includes a full listing of all of the active tags 304 currently in use in a network community. In other embodiments, active tags 304 may be selectively displayed in display 300 according to one or more criteria (e.g., based on a hierarchy, user preferences, community preferences, an alphabetized ordering, etc.) in order to accommodate large numbers of active tags. Display 300 may also include favorite active tags 306. Favorite active tags 306 may be active tags that are selected in some way by either tag system 112 and/or a particular user as being preferred, often used, favorites, etc. of a specific user. Favorite active tags may be one or a number of user or network definable favorite active tags. According to one embodiment, a user may add or delete favorite active tags 306 by selecting one of option 308 ("Add to Favorites") or option 310 ("Delete from Favorites"). According to another embodiment, favorite active tags 306 may be selected from the full list of active tags 304. In yet another embodiment, one or more favorite active tags may be automatically displayed according to various criteria (e.g., tag usage, tag category, session history, etc.) According to another embodiment, users may search and/or sort active tags 304, 306 according to various criteria (e.g., tag usage, tag category, key words, etc.).

Figure 4:
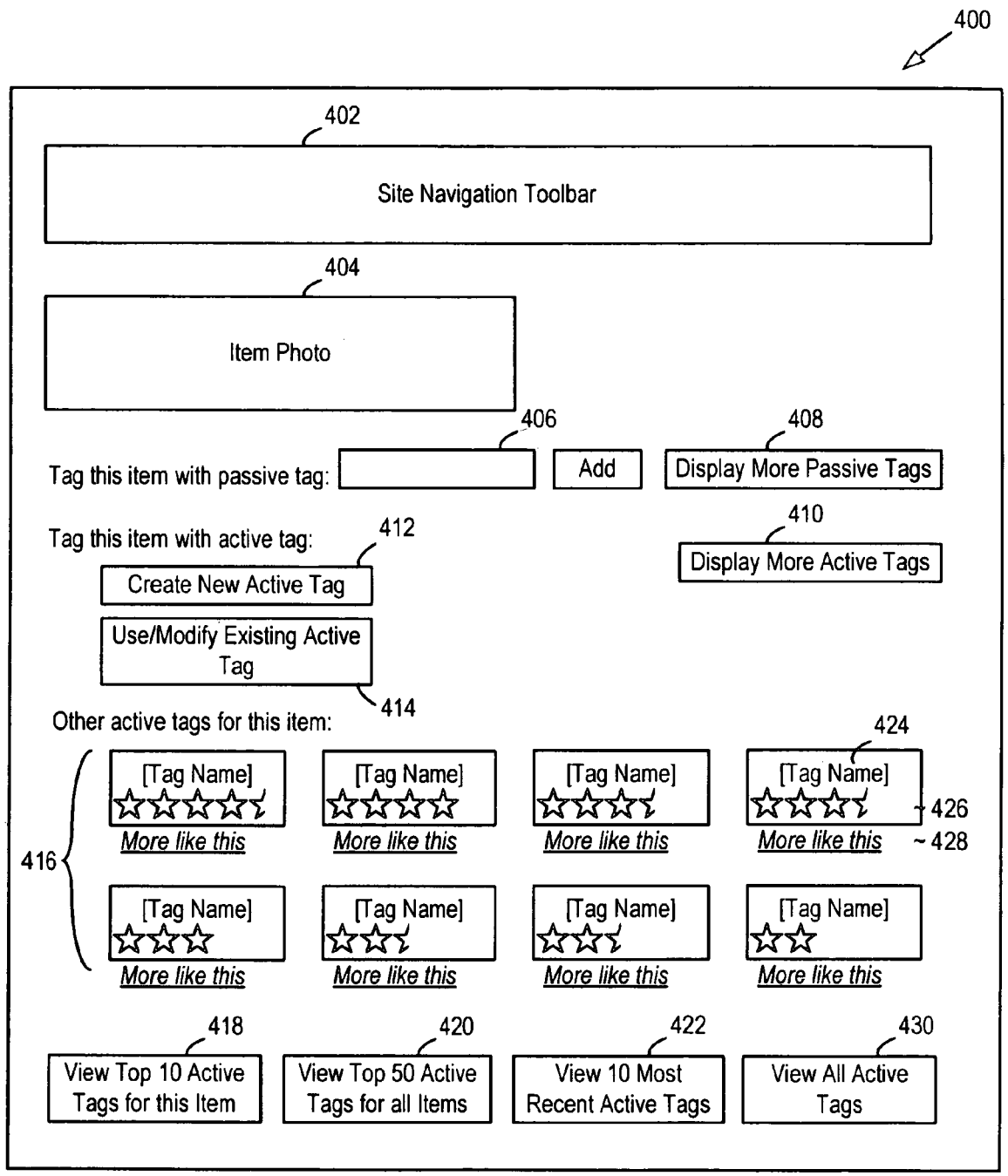
FIG. 4 is a sample user interface display of a tag creation/modification page according to one embodiment.

Returning to FIG. 2, in addition to the various active tags 214 and/or 216 that may be presented to users via display 200, tag service 112 may also provide users with an option to create their own active tags, modify active tags created by others, and view and/or provide feedback on active tags. As shown in FIG. 2, display 200 may contain option 212 ("Tag Creation/Viewing Links"). Option 212 may be configured such that when a user selects option 212, the user is directed to a display (e.g., a tag creation/modification page) containing additional tag related features. FIG. 4 illustrates a display 400 of such a tag creation/modification page according to one embodiment.

As shown in FIG. 4, display 400 may contain many of the same features as display 200 shown in FIG. 2. For example, display 400 may include a navigation toolbar 402 and an item photo 404. Display 400 may additionally include various other tag-specific features related to the item. For example, display 400 may include passive tag features, such as text box 406 (which may permit users to assign a passive text tag to the item), and an option 408 for permitting a user to view additional passive tags assigned to the item.

In addition to the above and other passive tag features, display 400 may also include active tag features. For example, display 400 includes option 412 ("Create New Active Tag") and option 414 ("Use/Modify Existing Active Tag") that allow users to create new active tags and/or use/modify existing active tags for the item, as discussed in further detail with respect to FIGS. 6-12. Display 400 also includes option 410 ("Display More Active Tags") which permits a user to request that tag service 112 provide additional active tags to the user. Further, display 400 may include information regarding other active tags for the item or for active tags in general. For example, as shown in FIG. 4, display 400 may include other (user and/or community) active tags 416 assigned to the item. In addition, further options may be provided for accessing subsets of active tags. For example, options 418 ("View Top 10 Active Tags for this Item"), 420 (View Top 50 Active Tags for all Items"), 422 ("View 10 Most Recent Active Tags"), and 430 ("View All Active Tags") are provided in display 400. Those skilled in the art will appreciate that in other embodiments, such subsets may include passive tags as well. As will be described in more detail below, tag service 112 permits users to utilize one or more of the features displayed in FIG. 4 in order to create, modify, view, etc., active tags.

Figure 5:
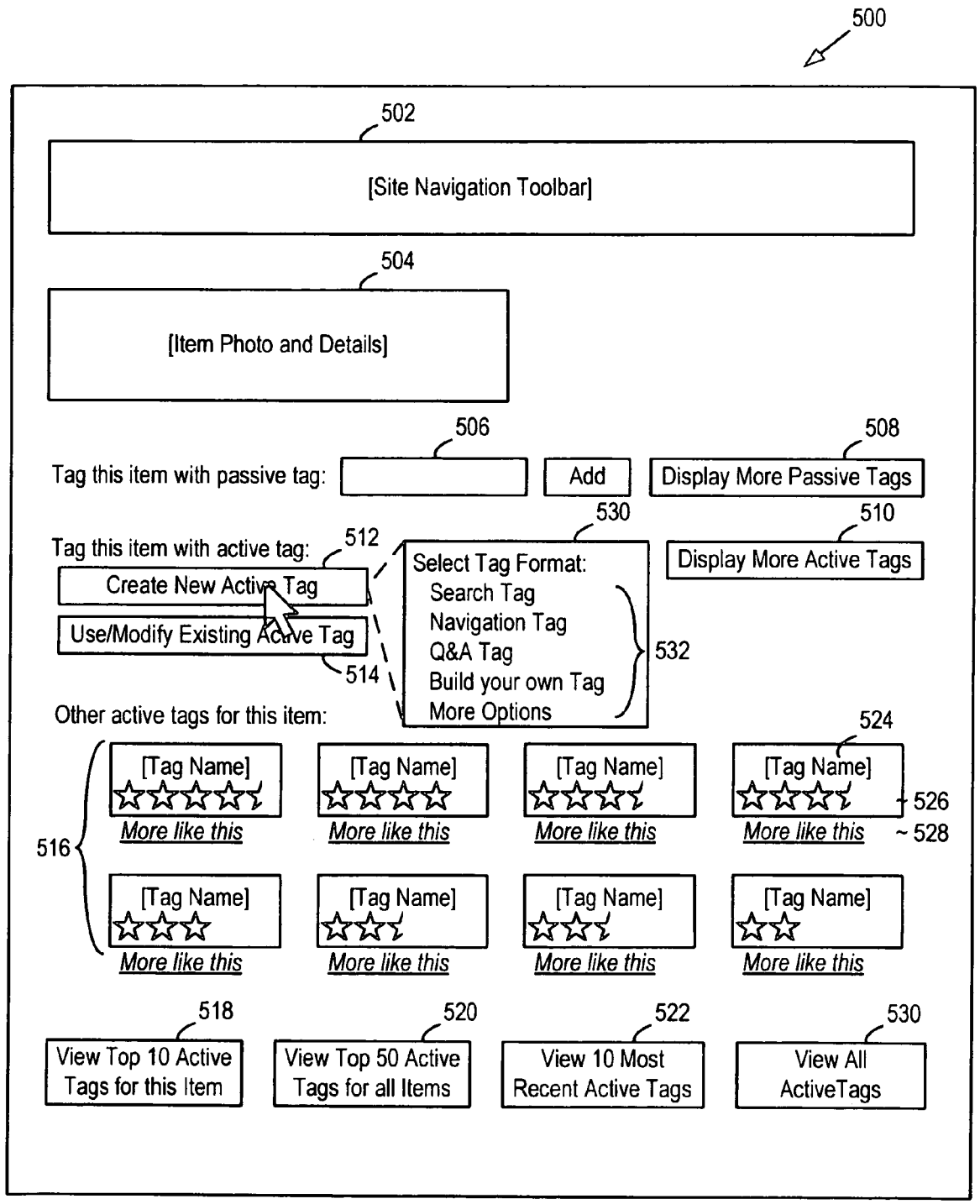
FIG. 5 is a sample user interface display of the creation/modification page when used to create an active tag according to one embodiment.

Referring now to FIG. 5, a display 500 showing a tag creation/modification page according to another embodiment is illustrated. In FIG. 5, a user has selected option 512 ("Create New Active Tag"). As shown in FIG. 5, tag service 112 may permit a user to select option 512 by use of a computer-generated pointer icon controlled by the user (e.g., via a "mouse"). Upon selecting option 512, tag service 112 may present the user with a menu 530 that includes various active tag format options 532 from which the user may select. For example, as shown in FIG. 5, format options 532 may include choices that allow a user to create a search tag, a navigation tag, a question and answer (Q&A) tag, and/or a customized, build-your-own tag. Tag service 112 may also provide the user with the ability to select more format options than those presented in menu 530 (e.g., by selecting "More Options" from menu 530). For example, other format options may be presented, depending on the environment in which the active tags are being used (e.g., in conjunction with files, documents, photos, etc.), the past tagging history of the current user or community of users, etc. As will be described in more detail below, upon selecting one of format options 532 shown in FIG. 5, tag service 112 may present the user with one or more templates that permit the user to configure the action to be performed when the active tag is selected.

Active tags may be configured to cause various actions or types of actions to be performed. Actions may be based, for example, on conditional logic (e.g., allowing users to specify conditions to be met and corresponding data to be returned to users). Further, the actions may return data based on computational logic (e.g., performing mathematical computations, comparisons, etc. based on data entered by users). Such logic may be used to configure active tags to provide, e.g., navigation actions, such that users are taken to one or more, or a series of, network resources (e.g., web sites, etc.) upon selecting the active tag. As yet another example, actions may be based on user responses to inquiries generated upon selection of the active tag. A wide array of other actions may be defined by users, and active tags may be based on any suitable combination of actions or other functionality. Various embodiments of different types of active tags and templates that permit users to configure active tags are discussed in further detail with respect to FIGS. 6-12.

In addition to creating a new active tag, a user may also use and/or modify an existing active tag by selecting option 514 ("Use/Modify Existing Active Tag") shown in FIG. 5. Upon selecting option 514, the user may be directed to a collection of active tags, such as the collection of active tags shown in display 300 of FIG. 3. In one embodiment, the user may select one or more of the active tags to modify, upon which the user may be permitted to modify the current configuration information of the selected active tag. Users may modify configuration information for existing active tags in the same way configuration information is input for newly created active tags, as is described in further detail below. In another embodiment, the user may select one or more active tags from the collection for use on an object of interest to the user, but without further modification.

Figure 6:
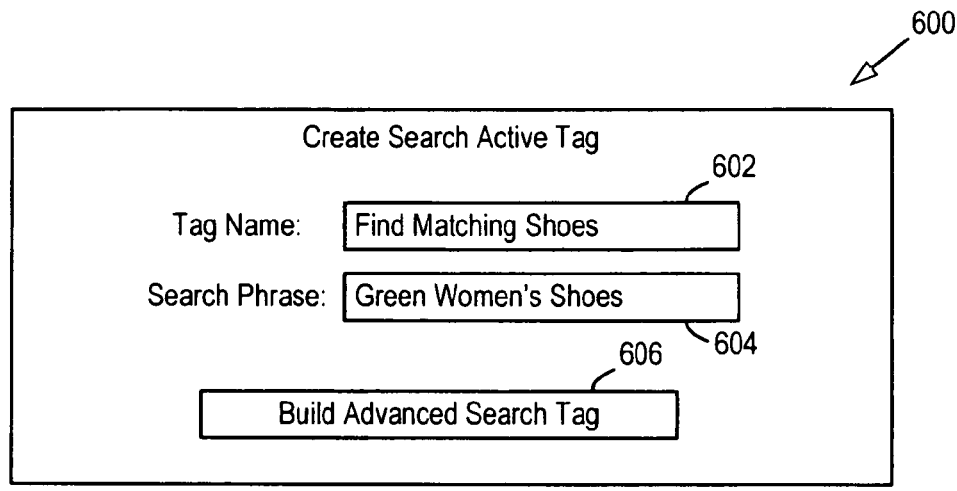
FIG. 6 is a sample user interface display of an active tag configuration template according to one embodiment.

Referring to FIG. 6, one embodiment of a display 600 is illustrated that permits a user to create an active tag that causes a search action to be performed. A "search" active tag may enable users to perform a search by selecting the search active tag. As shown in FIG. 6, display 600 may include a text box 602 and a text box 604. Text box 602 permits users to assign a name to the search active tag. The name may be any text chosen by the user, and the name may reflect the functionality of the active tag. For example, a user may choose to name a search active tag that is configured to return results identifying any shoes of the color green as "Find Matching Shoes." Text box 604 permits a user to enter a search query. Accordingly, when the search active tag is selected, tag logic 118 may then perform a search for items that satisfy the particular search query by submitting the search query to one or more search engines. While search active tags created using a format such as that shown in FIG. 6 may satisfy many users of tag service 112, certain users and/or tag service 112 may desire and/or specify additional searching functionality. For example, the parameters of the search (e.g., the search term(s), the content to be searched, the particular search algorithm or engine to be used, etc.) may be varied by users and/or tag service 112. According to another embodiment, a search active tag may be configured to search only within the network services system of the provider of tag service 112. According to another embodiment, the search tag may be configured to conduct a search on a more general scale (e.g., a general network-based search). Further, active tag searches may be associated with a variety of network resources, including various types of files, documents, displays, etc.

Figure 7:
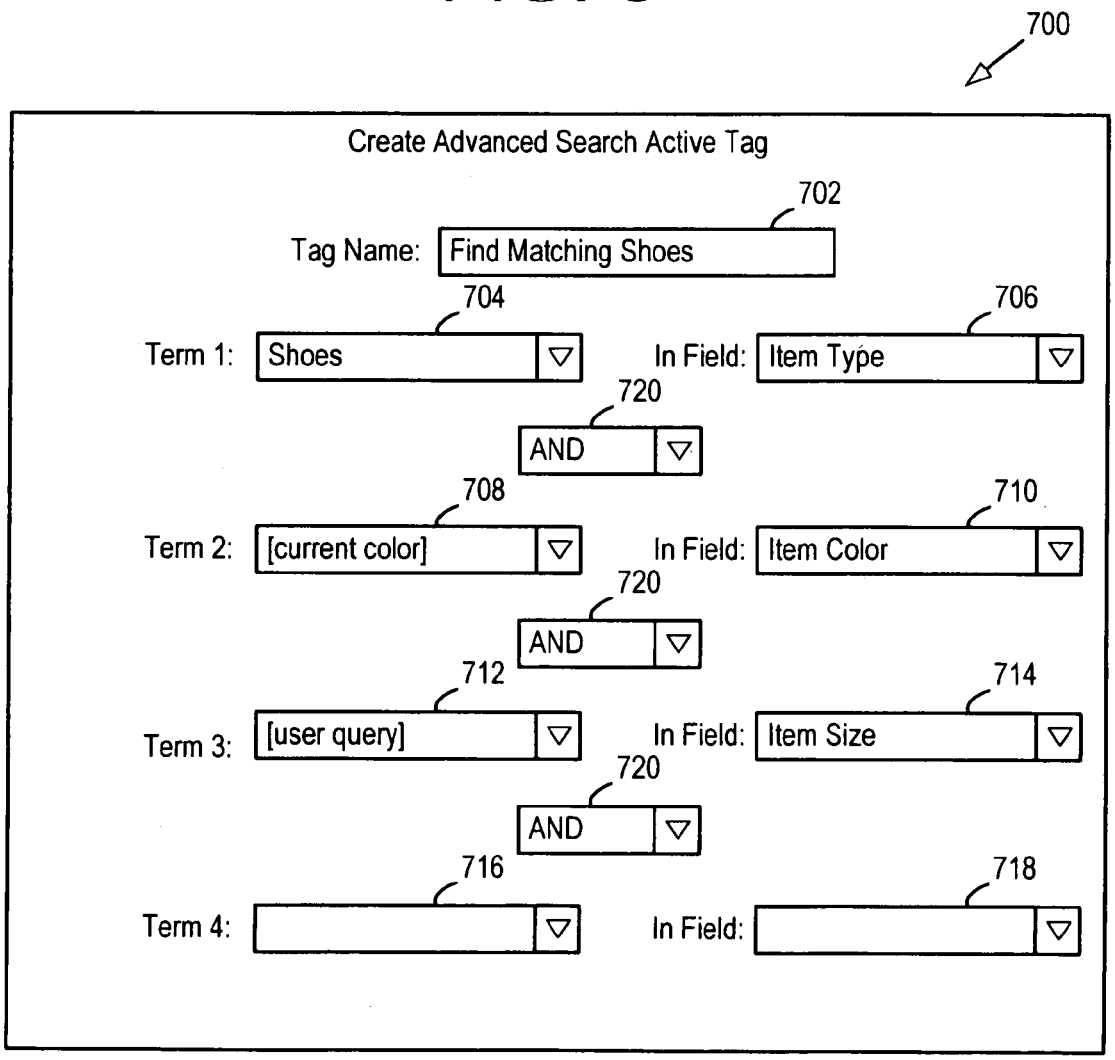
FIG. 7 is a sample user interface display of an active tag configuration template according to one embodiment.

In accordance with yet another embodiment of the invention, a user may build an advanced search active tag by, for example, selecting option 606 ("Build Advanced Search Tag") shown in FIG. 6. Referring to FIG. 7, one embodiment of a display 700 that permits a user to configure an advanced search active tag is illustrated. Display 700 illustrates a template for an advanced search active tag that allows a user to specify search terms for multiple data fields. As shown in FIG. 7, display 700 includes a text box 702 that permits the user to name the tag. Display 700 also includes a series of text boxes that allow a user to enter one or more search terms (see text boxes 704, 708, 712, 716) and one or more corresponding fields to be searched (see text boxes 706, 710, 714, 718). A user may further specify one or more connectors 720 (e.g., "AND," "OR," etc.) to further define the search parameters. As shown in FIG. 7, the fields to be searched are data fields related to retail items, but any of a number of different types of search terms and/or data fields may be utilized in configuring an advanced search active tag, depending, e.g., on the network services system 106 in which the tag service 112 is implemented or the type of object being tagged. For example, the object with which the search active tag is being associated may be a network-based article. Accordingly, the data fields may include fields for a title, abstract, summary, and so on.

According to one embodiment, the terms and fields of the search may be specified by the user. For example, the user may input a search term, such as the word "Shoes" shown in search term text box 704. A user may specify that the search term is to be based on a data field, such as an item type data field. Retail items may have various data (e.g., an item type, color, size, price, etc.) associated with them, and the data may be stored within data fields associated with the item and be accessible by tag logic 118. Accordingly, users may base search queries on information contained in the data fields. As shown in text box 708, a user has specified that the search term to be used in the search is the current color (e.g., green) of the item being viewed and that the data field to be searched is the item color field. In yet another embodiment, the active tag may be configured to query a subsequent user for a search term for a particular data field (see text box 714). Accordingly, when the active tag is selected, the subsequent user may be presented with a query (e.g., "What is your shoe size?"), the response to which may then be used as the search term (e.g., for an "item size" data field). Additional methods for populating the various text boxes illustrated in FIG. 7 may alternatively be used.

In practice, the advanced search active tag template described above may be utilized, e.g., by a user of a network-based retail web site. For instance, the user may be viewing a detail page, such as that shown in FIG. 2, for an article of green clothing shown in item photo 204. The user may wish to create an active tag for finding matching shoes of the appropriate size and color. Accordingly, the user may select a tag/creation viewing link 212 and navigate to a tag creation/modification page such as that shown in FIGS. 4 and 5.

Next, the user may select the create new active tag option 512, and select the search tag format option 532 from the resultant format menu 530. In response, the tag service 112 may provide a display 600 for a create search active tag template from which the user may choose the option 606 to build an advanced search active tag. The user may then configure an advanced search active tag using a template such as that shown in FIG. 7. For example, the user may create an advanced search active tag named "Find Matching Shoes" configured to search the inventory of the network-based retailer to find items that (1) are "shoes," as designated, for example, in an "Item Type" data field, (2) are the current color of the article of clothing currently being viewed, and (3) are the size of a subsequent user (who may be the same user that created the search active tag), as identified, for example through a response to a query posed to the subsequent user. The advanced search active tag, when selected, would then return items matching the specified criteria.

It should be noted that as presented herein, FIGS. 6 and 7 represent separate user interface displays. According to one embodiment, the templates contained in both display 600 (FIG. 6) and display 700 (FIG. 7) may be combined in a single display. Other variations in the features of displays 600 and 700 may also be made. Further, other templates may be provided to permit users to access and/or modify configuration information (e.g., by selecting option 414 shown in FIG. 4) for various type of active tags.

Figure 8:
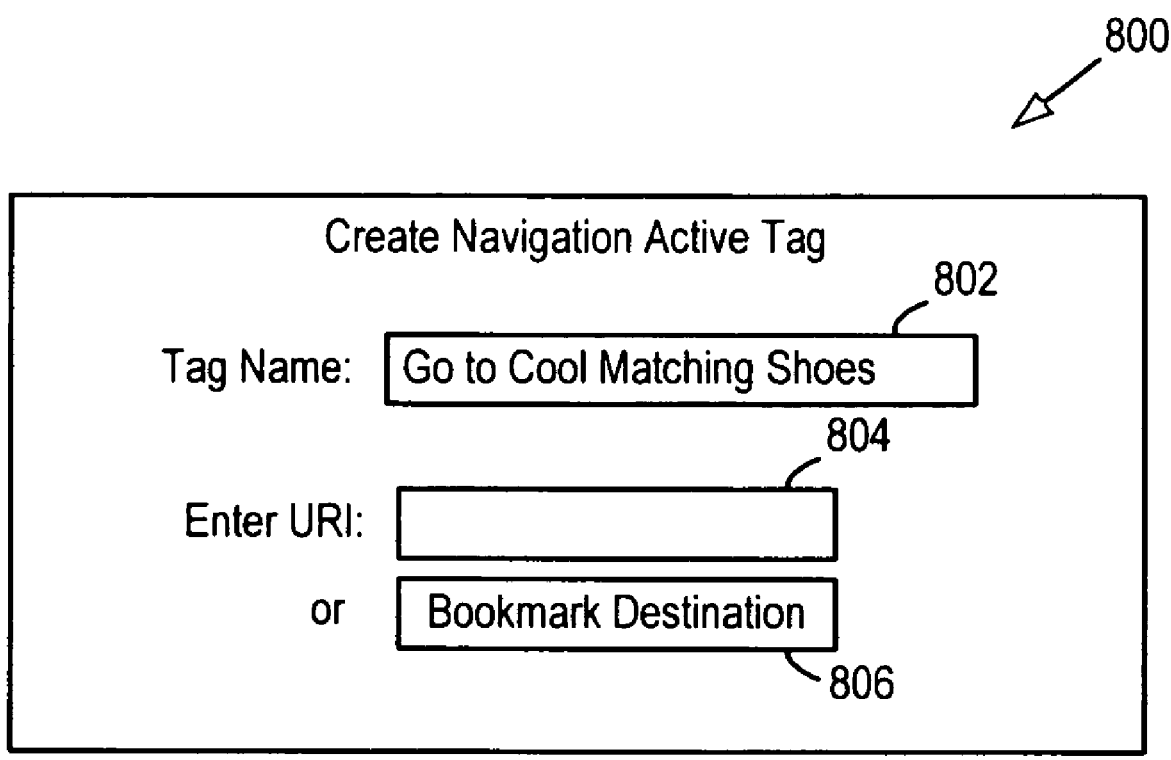
FIG. 8 is a sample user interface display of an active tag configuration template according to one embodiment.

Now that creation of a search active tag has been described, an embodiment of a user interface display 800 that permits a user to create an active tag that causes a navigation action to be performed is described in reference to FIG. 8. A navigation active tag may permit users to, for example, specify a navigation path such that a subsequent user (who may be the same user that created the navigation active tag) is directed to a specified network destination upon selecting the navigation active tag. As shown in FIG. 8, display 800 may include a text box 802 that permits the user to name the navigation active tag. Display 800 may also include text box 804 and bookmark option 806. Accordingly, a user may enter a Uniform Resource Identifier (URI) directly via text box 804 (e.g., by cutting and pasting a URI into text box 804 for a desired destination page). Alternatively, the user may select option 806 ("Bookmark Destination") while viewing the desired destination page (e.g., while the display of FIG. 8 is still viewable), upon which tag logic 118 may transfer the URI for the destination page to text box 804. As an example, a navigation active tag may be used as a "one-click" tag to deliver a user of a network-based retail operation directly to a checkout page. The destination may be a page on a website, or any other appropriate network resource. Other methods for specifying the destination for a navigation active tag may also be used.

Referring to FIGS. 9 and 10, embodiments of user interface displays are illustrated that permit a user to create an active tag that causes a question and answer (Q&A) action to be performed. A Q&A active tag may permit a user to specify questions and corresponding answer options to be presented to users selecting the Q&A active tag (see FIG. 9), and further specify one or more actions to be taken depending on the answers selected in response to the question(s) (see FIG. 10). As shown in FIG. 9, tag service 112 may present a user with a "Build Questionnaire" template such as in display 900. Display 900 may include text box 902 that allows a user to name the Q&A active tag. Display 900 may also includes features that allow a user to specify one or more questions and answers (e.g., in a multiple-choice answer format) to be presented to users selecting the Q&A active tag. For example, as shown in FIG. 9, display 900 includes question text box 904, which allows the user to enter the text of a first question to be presented to subsequent users (who may include the user that created the Q&A active tag). Display 900 also includes answer selection text boxes 906, 908, 910, and 912, which allow the user to specify one or more possible answers to the question. For example, the questionnaire shown in FIG. 9 shows a question ("How much do you want to spend?") and four answers (e.g., "A) Less than $100," etc.). According to one embodiment, the question and answers are presented to users selecting the Q&A active tag in a multiple choice format (e.g., with answers labeled "A," "B," "C," and so on, following the question). Other Q&A formats may also be used.

Display 900 may also include additional features that permit, for example, additional answer selections to be added (see option 914 ("Add another answer selection")) and/or additional questions to be added (see option 916 ("Add another question")). Upon completing the questionnaire, the user may select option 918 ("Done with questions; Build action logic), at which point tag logic 118 may present the user with a display such as that shown in FIG. 10. Other features and/or options may also be presented in connection with display 900.

Referring to FIG. 10, according to one embodiment, tag logic 118 may present the user with a "Build Action Logic" template such as in display 1000. Display 1000 includes the tag name 1002 (as specified via text box 902 described with respect to FIG. 9). Display 1000 also includes an action logic template 1004. According to one embodiment, template 1004 permits users to enter logic (e.g., boolean logic), that determines what action is to be taken based upon how a user answers the question(s) specified in the Q&A questionnaire of FIG. 9. For example, the action logic shown in template 1004 specifies various products to be displayed to a user depending on how the user answers the questions from the previously built questionnaire. The action logic is than implemented (thereby causing an action to show a particular product) when the Q&A active tag is performed.

According to another embodiment, the user may be presented with a more structured format (e.g., a fill-in-the-blank type format) for entering the action logic, similar to that used with respect to the questionnaire shown in FIG. 9 (e.g., by providing "IF, "AND/OR," and "THEN" logic terms and allowing the user to specify the condition(s) to be satisfied and the action(s) to be taken). Various other types of templates may also be used in creating a Q&A active tag to accommodate various types of users of tag service 112.

In practice, the Q&A active tag templates described above may be utilized by a user of, e.g., a network-based retail web site. For instance, the user may be viewing a detail page, such as that shown in FIG. 2, for a digital camera shown in item photo 204. The user may then wish to create a Q&A active tag for digital cameras. Accordingly, the user may navigate to the build questionnaire template of, e.g., display 900.

Next, the user may input a name for the Q&A active tag (e.g., "Digital Camera Selector") in text box 902, as well as a first question ("Q1"), e.g., "How much do you want to spend?," in text box 904. In addition, the user may enter multiple choice answer selections A-D for the first question in text boxes 906-912, respectively. As can be seen from the embodiments illustrated in FIGS. 9 and 10, the user adds three more questions (i.e., Q2-Q4), each with its own multiple choice answer selections (A-D) using the add another question option 916 and add another answer selection 914 of display 900.

Once the user has entered the desired questions and answer selections, the user may then build the action logic for the Q&A active tag using template 1004 in display 1000. For example, as shown in FIG. 10, the user may enter boolean logic such that if a subsequent user to whom the questionnaire is presented (as a result of selection of the Q&A active tag) selects answer A to the first question Q1, the second question Q2, and the third question Q3, and either answer A or B to the fourth question Q4, the tag service 112 will cause a detail page for an item with product ID #1234 to be displayed. As can be seen from FIG. 10, detail pages for different products will be displayed as the result of additional boolean logic depending on how the subsequent user answers the questions from the questionnaire.

Figure 11:
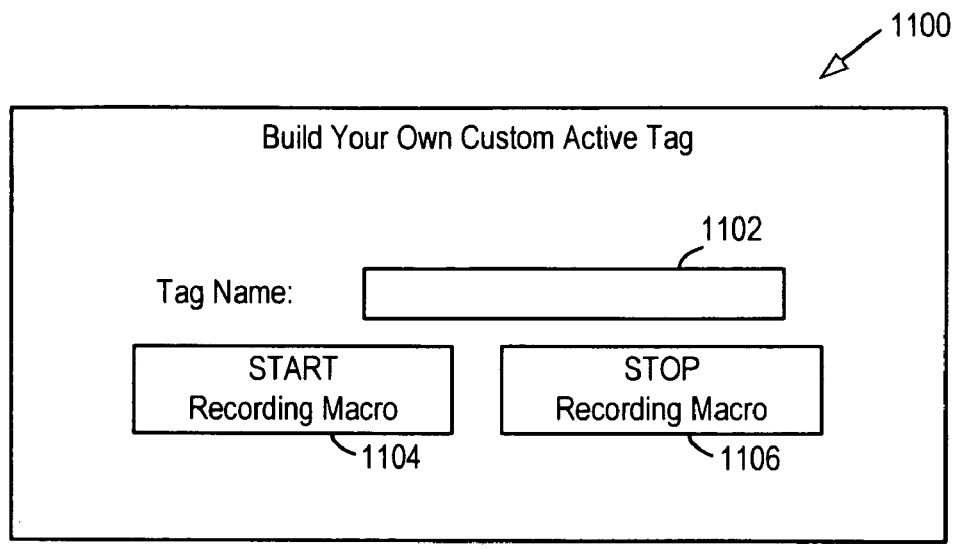
FIG. 11 is a sample user interface display of an active tag configuration template according to one embodiment.

Now that creation of a Q&A active tag has been described, an embodiment of a user interface display 1100 that permits a user to build their own custom active tag is described. A custom active tag template may permit users to customize active tags and the actions such tags cause to be performed with little or no format constraints. As shown in FIG. 11, a custom active tag may allow a user to name the active tag by entering text into text box 1102, and to utilize a macro recorder to record the actions to be performed when the custom active tag is selected. For example, a user may select option 1104 ("START Recording Macro"), and then perform certain functions (e.g., navigate to certain network resources and perform certain functions at each location, etc.), which are recorded by tag logic 118. The user may then select option 1106 ("STOP Recording Macro") when the user wishes to stop recording the macro. Accordingly, subsequent selection of the custom active tag causes the recorded macro to be run. For example, a user may create a custom active tag by visiting various detail pages of a network-based retail site and selecting various components of a clothing outfit at each page. Upon a subsequent user selecting the custom active tag, tag logic 118 may present the user with the sequence of visited detail pages and eventually the complete outfit (e.g., a display including each of the items specified during configuration of the custom active tag). As another example, a user at a photo-sharing site may create a custom active tag by recording a macro of selecting various photos that relate to a particular subject matter or topic, and subsequent users may be presented with the selected photos upon selection of the custom active tag.

Figure 12:
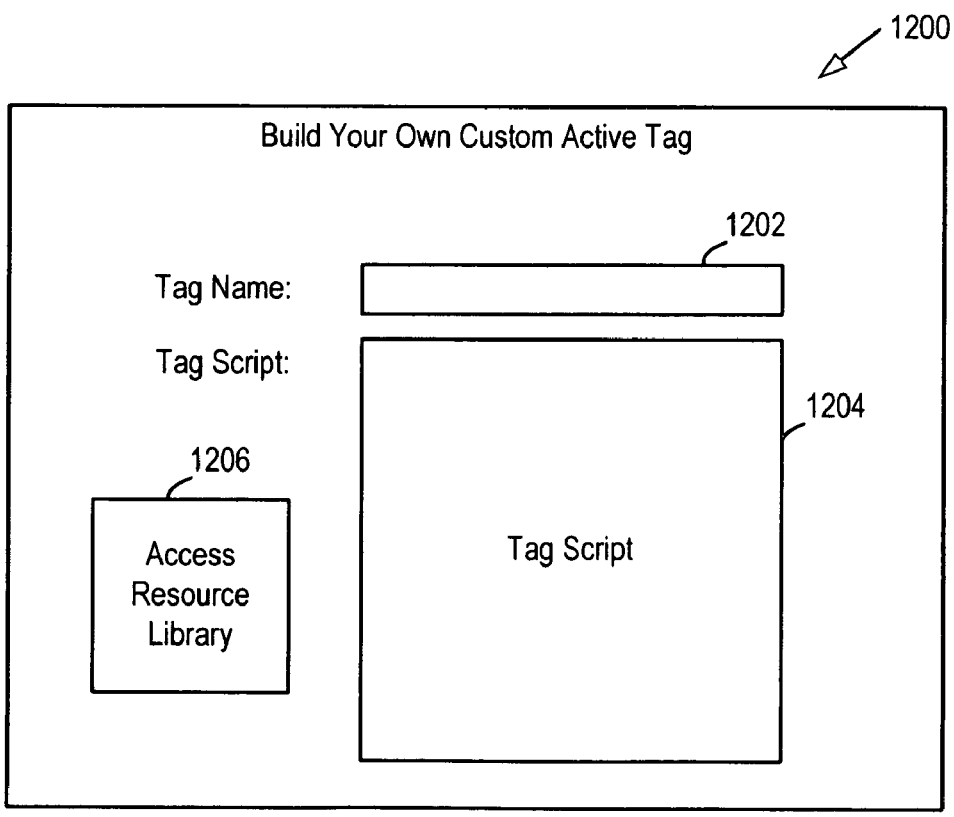
FIG. 12 is a sample user interface display of an active tag configuration template according to one embodiment.

Referring to FIG. 12, another embodiment of a display 1200 that permits a user to build their own custom active tag is illustrated. The build-your-own active tag user interface display shown in FIG. 12 permits a user to script code directly. As shown in FIG. 12, display 1200 includes a text box 1202 that permits the user to assign a name to the active tag. Display 1200 also includes a script box 1204 that permits users to enter code directly. For example, a user may create a custom active tag such that it presents a subsequent user with related items in a network-based retail site, in addition to the one currently being viewed, by considering the demographics of the user, the purchasing history of the user, the price range and type of item currently being viewed, etc. Code scripting may be used in a wide variety of other environments, including environments outside the fields of e-commerce and commercial operations. In addition, the user creating the custom active tag may vary the sophistication and complexity of the actions to be performed by entering code accordingly. As can be seen, various actions may be performed in response to the configuration information provided by users via script box 1204. In some embodiments, the user may personally author the code entered in the script box 1204 and/or may copy pre-existing or third-party resources in the script box 1204. Accordingly, in one embodiment, display 1200 may include option 1206 ("Access Resource Library") that upon being selected may direct the user to a resource library that may contain, for example, preformatted code script, web service features, etc. The user may select such resources for inclusion in the tag script box 1204.

It should be noted that tag service 112 may provide more or fewer active tag formats or templates to users than those illustrated with respect to FIGS. 6-12, and the format of the various user interface displays may be modified to suit the particular environment in which tag service 112 is being used. Further, in addition to creating and/or modifying active tags, users may view related active tags (e.g., earlier or later versions of a tag), view the underlying configuration information of the tag (e.g., the search logic, script, or other applicable logic) that determines the operation of the active tag, provide feedback to tag service 112 regarding an active tag or different versions of an active tag, and so on. These additional features are discussed in further detail with respect to FIGS. 13-16.

Figure 13:
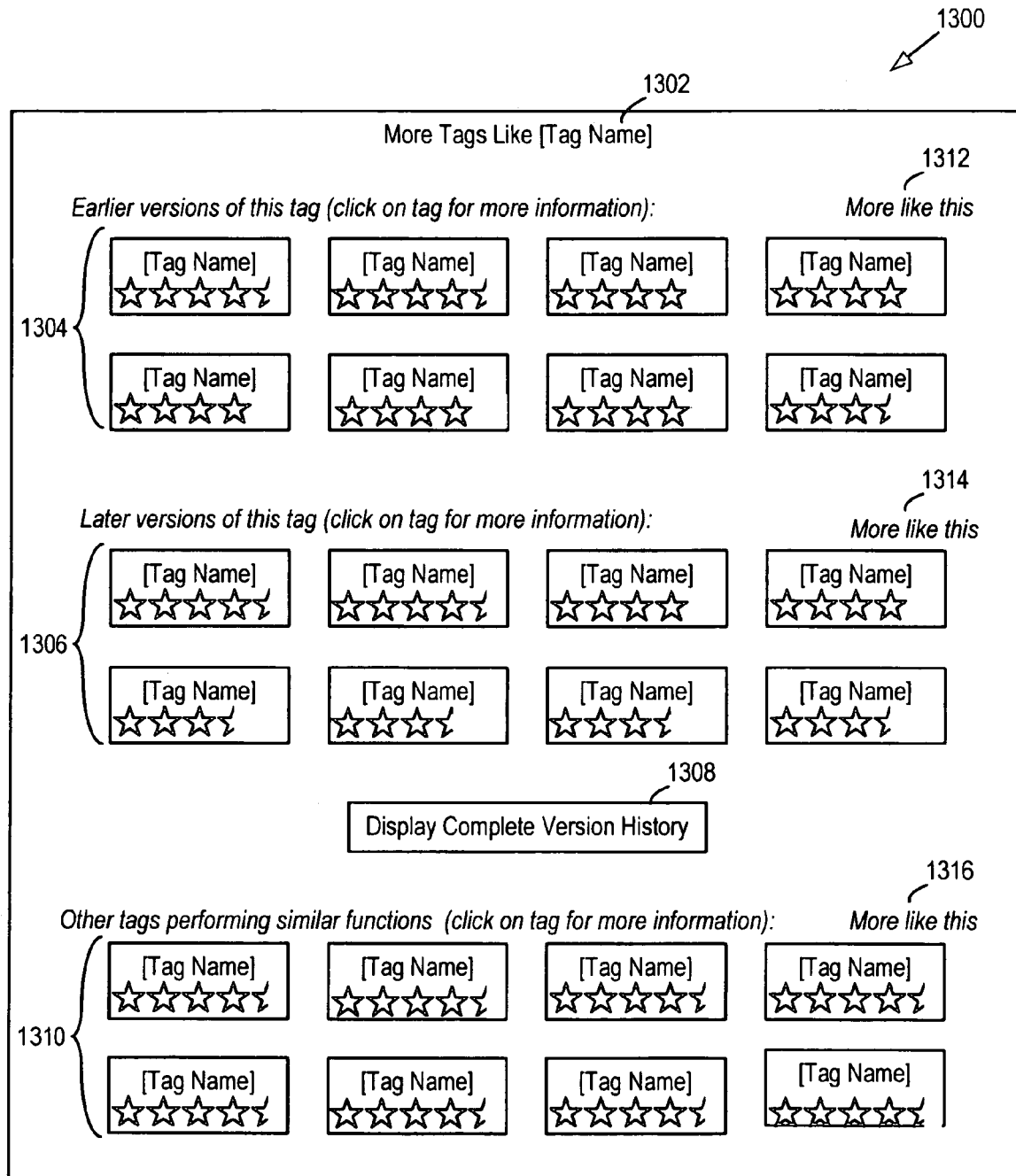
FIG. 13 is a sample user interface display of various related active tags according to one embodiment.

Referring now to FIG. 13, a display 1300 showing various related active tags according to one embodiment is shown. Display 1300 may be accessed by users of tag service 112 requesting, for example, option 528 ("More like this") shown in FIG. 5. Upon the user selecting option 528, the user may be presented with display 1300, which includes earlier versions 1304 of the active tag, later versions 1306 of the active tag, and similar active tags 1310 (e.g., active tags that perform similar functions). Other related active tags may also be provided to the user. Because active tags may be modified by other users, a given active tag may have numerous earlier and/or later versions. Accordingly, display 1300 may not display all of earlier versions 1304 and/or later versions 1306 at one time, and a user may request additional versions of the active tag by selecting option 1312 or 1314 ("More like this") or option 1308 ("Display Complete Version History"). Similarly, additional similar active tags 1310 may be viewed by selecting option 1316. Tag service 112 may permit users to access the logic and/or other configuration information that determines the operation of the active tag by selecting (e.g., highlighting, clicking on, etc.) one of the active tags presented.

Figure 14:
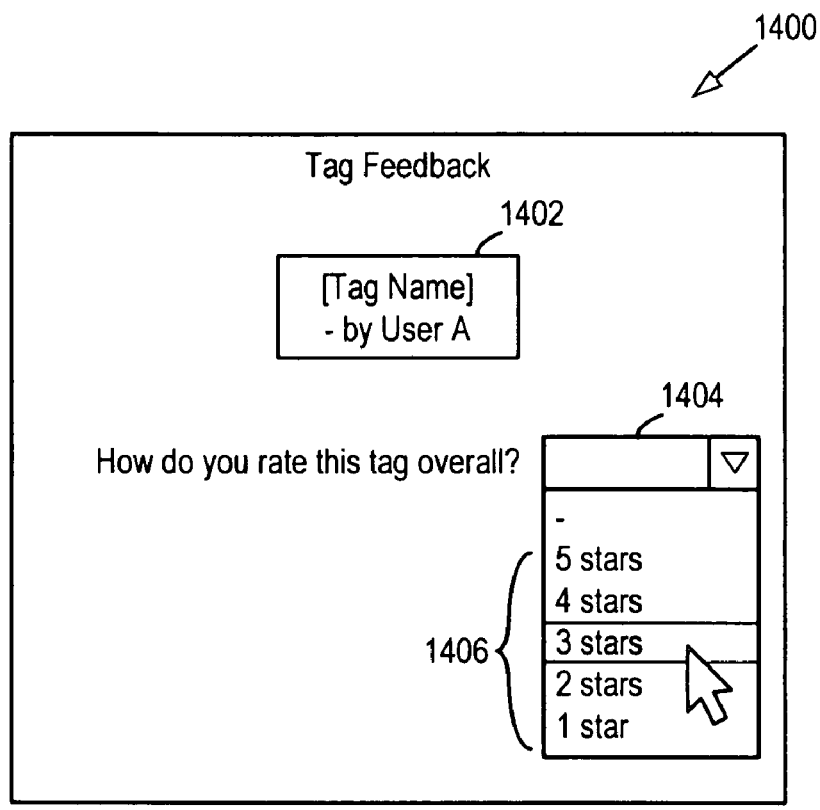
FIG. 14 is a sample user interface display for rating an active tag according to one embodiment.
Figure 15:
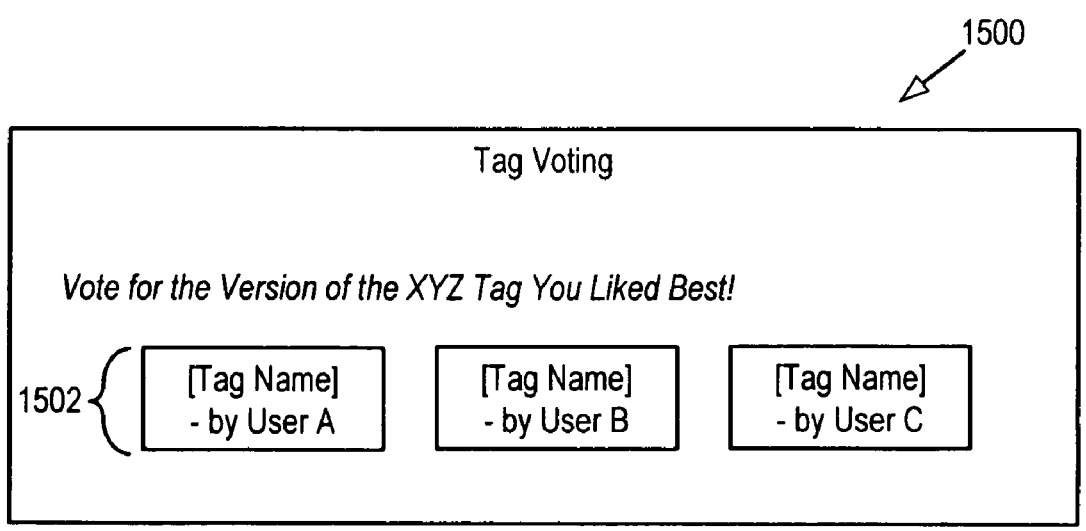
FIG. 15 is a sample user interface display for voting on active tags according to one embodiment.

Referring now to FIGS. 14 and 15, tag service 112 may additionally permit users to provide feedback regarding active tags (e.g., rate individual active tags and/or vote for preferred active tags). For example, a user may be presented with an active tag feedback display such as display 1400 shown in FIG. 14 upon selecting one of the active tags displayed in FIG. 13 or in response to selecting a feedback option placed on, e.g., a detail page. As shown in FIG. 14, the user may be presented with the name 1402 of the active tag, and a ratings input box 1404. A user may type a rating into input box 1404, or the user may alternatively choose one of a group of rating options 1406 that may be presented to the user. Such rating information may be used by tag logic 118, for example, to rate the active tags assigned to a specific item (e.g., by assigning 1-5 stars to a tag), and then present the active tags to users in order of rating (e.g., with active tags having higher ratings being presented more prominently, more frequently, etc., to users of tag service 112). Further, referring back to FIG. 4, tag logic 118 may present users with the tag rating 426 in addition to the name 424 of the active tag, thereby providing users with information as to how the active tag has been rated overall by users of tag service 112. Further yet, information provided in display 1400 may be used, for example, to deny access to users upon receiving reports (e.g., poor ratings, etc.) indicating that particular users have created active tags containing offensive material, etc.

According to another embodiment, shown in FIG. 15, in addition to rating individual active tags, tag service 112 may permit users to select (e.g., vote for) the version of an active tag that they prefer. As shown in FIG. 15, display 1500 includes various versions 1502 of a given active tag, and may further identify the name and/or creator of each version 1502 (e.g., "User A"). The user may select the version they prefer, and tag logic 118 may use this information similarly to the tag ratings (see FIG. 14) to present active tags to users of tag service 112. Other methods of specifying preferred versions of active tags may also be used. Tag logic 118 may further store the ratings according to the individual users creating the active tags, such that user-specific feedback may be provided (e.g., by displaying the names of users with the highest rated active tags, etc.) to users of tag service 112.

Figure 16:
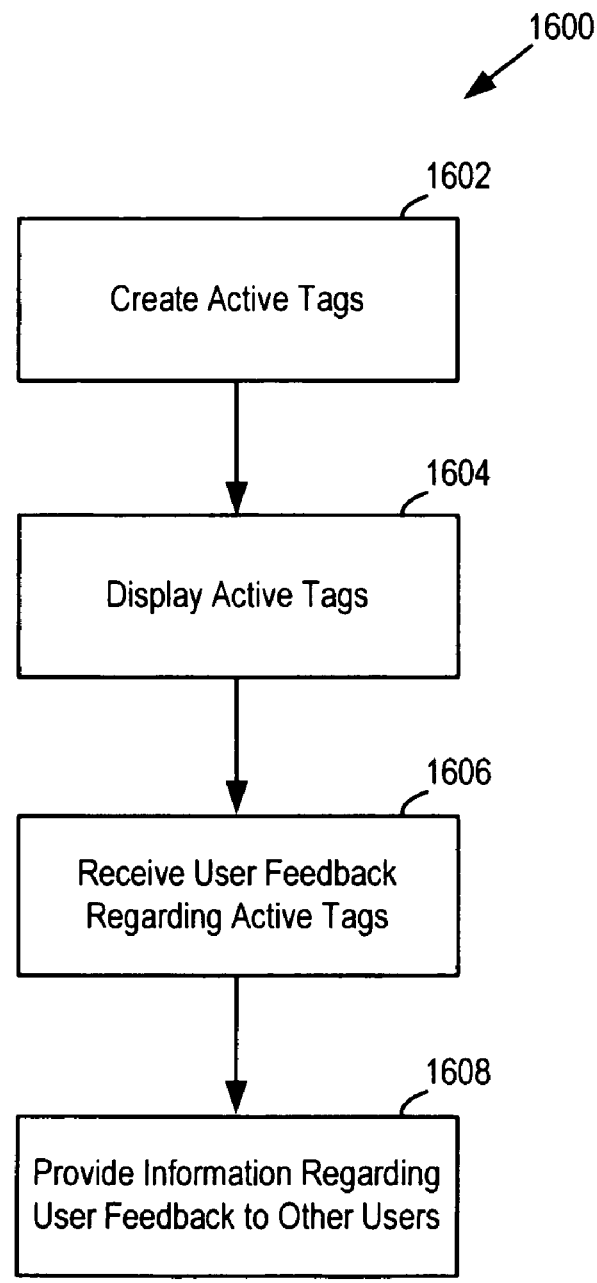
FIG. 16 is a flowchart illustrating the process of providing feedback regarding active tags according to one embodiment.

Referring to FIG. 16, a flowchart illustrating one embodiment of processing feedback for active tags is shown. At step 1602, one or more active tags are created. The active tag may be created using one of the methods described with respect to FIGS. 6-12 or any other suitable method, and may be created at various times. At step 1604, the active tags are displayed to users of tag service 112. The active tags may be displayed using any of the embodiments discussed herein, including those discussed with respect to FIGS. 4 and 5. The various active tags may be displayed at various times, and in connection with differing network resources. At step 1606, tag service 112 receives feedback (e.g., ratings, preferences, etc.) from users regarding the various active tags. The feedback may be provided, for example, via a display similar to one of the displays discussed with respect to FIGS. 14 and 15. At step 1608, tag service 112 provides information regarding the feedback to other users. One embodiment of the type of information that may be provided to other users is shown as rating 426 shown in FIG. 4. Alternatively, feedback may be provided to users with a display such as display 1300 shown in FIG. 13. Other types of information regarding the feedback provided by users may also be presented.

Here and throughout, terms such as "web page," "website," and so forth are used to give specific illustrative examples of settings in which on-line content can be presented to and perceived by users. Such examples are not intended to be limiting, and persons of skill in the art will appreciate that many other such settings now known or yet to be developed may be suitable to the practice of the present invention in specific embodiments.

It should be noted that although flowcharts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

One system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method for data processing, comprising:
  receiving a request from a user to create an active tag;
  providing a configuration information template to the user in response to the request;
  receiving configuration information for the active tag, wherein the configuration information is provided by the user in the configuration information template;
  causing the display of the active tag to a plurality of users; and
  upon selection of the active tag, performing an action based at least upon the configuration information for the active tag;
  wherein the configuration information is accessible by at least one other user, and wherein the configuration information may be modified by at least one of the plurality of users.

2. The method of claim 1, wherein the configuration information includes conditional logic.

3. The method of claim 1, wherein the configuration information includes computational logic.

4. The method of claim 1, wherein the configuration information includes a search query, and wherein the action performed is a search based at least upon the search query.

5. The method of claim 1, wherein the configuration information includes a question to be displayed, and wherein the action performed is based at least upon an answer received responsive to the question.

6. The method of claim 1, wherein the configuration information includes a uniform resource identifier for a network resource, and wherein the action performed includes displaying the network resource identified by the uniform resource identifier.

7. The method of claim 1, wherein the configuration information includes at least one macro recorded by the user, and wherein the action performed is determined based at least upon the recorded at least one macro.

8. The method of claim 1, wherein the configuration information includes computer code, and wherein the action performed is determined based on the computer code.

9. The method of claim 8, wherein at least a portion of the computer code is authored by the user.

10. The method of claim 8, wherein at least a portion of the computer code is authored by a third party.

11. A computer-implemented data processing system, comprising:
    tag logic for permitting a user to create an active tag, wherein the active tag is associated with an object, wherein the active tag includes configuration information that defines an action to be performed upon selection of the active tag, and wherein the configuration information is accessible by another user; and
    a user interface in communication with the tag logic, the user interface for displaying the active tag;
    wherein the configuration information defines: (i) a navigation action to be performed, (ii) a search action to be performed according to at least one search parameter, (iii) an action to be performed based on a macro recorded by the tag logic, or (iv) at least one question to be displayed, and wherein the action to be performed is determined based at least upon an answer received responsive to the question.

12. The system of claim 11, wherein the tag logic permits another user who has accessed the configuration information for the active tag to modify the configuration information for the active tag.

13. The system of claim 11, wherein the configuration information defines a search action to be performed according to at least one search parameter, and wherein the at least one search parameter is a search term included in the configuration information.

14. The system of claim 11, wherein the configuration information defines a search action to be performed according to at least one search parameter, and wherein the at least one search parameter is a search term received from a user.

15. A computer-implemented data processing system, comprising:
    a collection of active tags from a community of users, wherein each active tag is associated by a user with an object, and wherein each active tag causes an action to be performed; and
    a user interface for accessing at least one active tag in the collection;
    wherein accessing at least one active tag comprises creating, modifying, copying, voting for, or rating the at least one active tag.

16. The system of claim 15, wherein the collection of active tags is displayed via the user interface.

17. The system of claim 16, wherein the collection of active tags displayed via the user interface is a subset of active tags from the community of users.

18. The system of claim 17, wherein the subset of active tags is selected based on at least one of tag usage, tag ratings, tag votes, tag categories, tag versions, tag similarities, user identity, user preferences, and community preferences.

19. The system of claim 17, wherein the subset of active tags includes active tags associated with an object by a particular user.

20. The system of claim 17, wherein the subset of active tags includes active tags associated with an object by the community of users.

21. The system of claim 15, wherein selection of an active tag in the collection causes the action of the active tag to be performed.

22. The system of claim 21, wherein selection of the active tag is made by a user.

23. The system of claim 21, wherein selection of the active tag is made automatically.

24. A computer-implemented method for data processing, comprising:
    identifying a plurality of active tags from a community of users, wherein each active tag is associated by a user with an object and wherein each active tag defines an action to be performed;
    providing access to at least one of the plurality of active tags to a user from the community; and
    causing the display of the at least one active tag.

25. The method of claim 24, wherein the at least one active tag displayed is identified based on at least one of tag usage, tag ratings, tag votes, tag categories, tag versions, tag similarities, user identity, user preferences and community preferences.

26. The method of claim 24, further comprising enabling selection of at least one of the plurality of active tags, wherein selection of the at least one active tag causes the action defined by the at least one active tag to be performed.

27. The method of claim 26, wherein selection of the active tag is made by a user.

28. The method of claim 26 wherein selection of the active tag is made automatically.

29. The method of claim 24, wherein providing access to at least one of the plurality of active tags permits the user to create the at least one active tag.

30. The method of claim 24, wherein providing access to at least one of the plurality of active tags permits the user to modify the at least one active tag.

31. The method of claim 24, wherein providing access to at least one of the plurality of active tags permits the user to copy the at least one active tag such that the at least one active tag is associated with a different object.

32. The method of claim 24, wherein providing access to at least one of the plurality of active tags permits the user to provide feedback regarding the at least one active tag.

33. The method of claim 32, wherein the feedback includes a rating of the at least one active tag.

34. The method of claim 32, wherein the feedback includes a rating of different versions of the at least one active tag.

35. The method of claim 32, wherein the feedback includes a vote for the at least one active tag.

36. The method of claim 32, wherein the feedback includes a report regarding the at least one active tag.

37. The method of claim 36, further comprising denying access to another user to the plurality of tags based on the report.

38. A computer-implemented system for data processing, comprising:
- a collection of active tags from a community of users, wherein each active tag is associated with an object, and wherein each active tag, upon selection, causes an action to he performed; and
- a user interface permitting a user in the community to provide feedback regarding at least one of the active tags in the collection;
- wherein the feedback includes a rating of the at least one active tag, a rating of different versions of the at least one active tag, a vote for the at least one active tag, or a report regarding the at least one active tag.

39. The system of claim 38, wherein the active tags in the collection are selectively displayed based upon the feedback provided via the user interface.

40. The system of claim 38, wherein the feedback includes a rating of the at least one active tag, and wherein the rating of the at least one active tag is displayed with the at least one active tag.

41. The system of claim 38, wherein the feedback includes a rating of different versions of the at least one active tag, and wherein the rating of different versions of the at least one active tag is displayed.

42. The system of claim 38, wherein the feedback includes a vote for the at least one active tag, and wherein the at least one active tag is displayed according to a number of votes that the at least one active tag has received.

43. A computer-implemented method for data processing, comprising:
- identifying a plurality of active tags, wherein each active tag is associated with an object, and wherein each active tag, upon selection, causes an action to be performed;
- enabling a user to provide feedback regarding at least one of the active tags; and
- selectively causing the display of the active tags based at least upon the feedback.

44. The method of claim 43, wherein the feedback includes a rating of the at least one active tag.

45. The method of claim 44, wherein selectively causing the display of the active tags includes causing the display of the rating of the at least one active tag.

46. The method of claim 43, wherein the feedback includes a rating of different versions of the at least one active tag.

47. The method of claim 46, further comprising causing the display of the rating of different versions of the at least one active tag.

48. The method of claim 43, further comprising denying access to the plurality of active tags to another user based on the feedback.

49. A computer-implemented system for data processing, comprising:
- a collection of active tags from a community of users, wherein each active tag is associated with an object, and wherein each active tag, upon selection, causes an action to be performed; and
- a user interface for selectively displaying the collection of active tags to the community of users;
- wherein selectively displaying the collection of active tags includes displaying active tags selected based on user preferences, the identity of a particular user, or community preferences.

50. The system of claim 49, wherein selectively displaying the collection of active tags includes displaying active tags selected based at least upon tag usage.

51. The system of claim 49, wherein selectively displaying the collection of active tags includes displaying active tags selected based at least upon tag ratings.

52. The system of claim 49, wherein selectively displaying the collection of active tags includes displaying active tags selected based at least upon tag votes.

53. The system of claim 49, wherein selectively displaying the collection of active tags includes displaying active tags selected based at least upon tag categories.

54. The system of claim 49, wherein selectively displaying the collection of active tags includes displaying active tags selected based at least upon tag versions.

55. The system of claim 49, wherein selectively displaying the collection of active tags includes displaying active tags selected based at least upon tag similarities.

56. The system of claim 49, wherein selectively displaying the collection of active tags includes displaying the active tags selected based at least upon feedback provided by the community of users.

57. A computer-implemented method for data processing, comprising:
- identifying a plurality of active tags, wherein each active tag is associated with an object, and wherein each active tag, upon selection, causes an action to be performed; and
- selectively displaying the plurality of active tags to a plurality of users;
- wherein selectively displaying the collection of active tags includes displaying active tags selected based at least upon tag usage, tag ratings, tag votes, tag categories, tag versions, or tag similarities.

58. The method of claim 57, wherein selectively displaying the collection of active tags includes displaying active tags selected based at least upon user preferences.

59. The method of claim 57, wherein selectively displaying the collection of active tags includes displaying active tags selected based at least upon the identity of a particular user.

60. The method of claim 57, wherein selectively displaying the collection of active tags includes displaying active tags selected based at least upon community preferences.

61. The method of claim 57, wherein selectively displaying the collection of active tags includes displaying the active tags selected based at least upon feedback provided by the community of users.

62. A computer-implemented method for data processing, comprising:
- receiving a request from a user to create an active tag;
- providing a configuration information template to the user in response to the request;
- receiving configuration information for the active tag, wherein the configuration information is provided by the user in the configuration information template;
- causing the display of the active tag to a plurality of users; and
- upon selection of the active tag, performing an action based at least upon the configuration information for the active tag;
- wherein the configuration information is accessible by at least one other user, and wherein the configuration information includes conditional logic or computational logic.

63. A computer-implemented method for data processing, comprising:
- receiving a request from a user to create an active tag;

providing a configuration information template to the user in response to the request;

receiving configuration information for the active tag, wherein the configuration information is provided by the user in the configuration information template;

causing the display of the active tag to a plurality of users; and upon selection of the active tag, performing an action based upon the configuration information for the active tag;

wherein the configuration information is accessible by at least one other user, wherein the configuration information includes a search query, and wherein the action performed is a search based at least upon the search query.

64. A computer-implemented method for data processing, comprising:

receiving a request from a user to create an active tag;

providing a configuration information template to the user in response to the request;

receiving configuration information for the active tag, wherein the configuration information is provided by the user in the configuration information template;

causing the display of the active tag to a plurality of users; and upon selection of the active tag, performing an action based upon the configuration information for the active tag;

wherein the configuration information is accessible by at least one other user, wherein the configuration information includes a question to be displayed, and wherein the action performed is based at least upon an answer received responsive to the question.

65. A computer-implemented method for data processing, comprising:

receiving a request from a user to create an active tag;

providing a configuration information template to the user in response to the request;

receiving configuration information for the active tag, wherein the configuration information is provided by the user in the configuration information template;

causing the display of the active tag to a plurality of users; and upon selection of the active tag, performing an action based upon the configuration information for the active tag;

wherein the configuration information is accessible by at least one other user, wherein the configuration information includes a uniform resource identifier for a network resource, and wherein the action performed includes causing the display of the network resource identified by the uniform resource identifier.

66. A computer-implemented method for data processing, comprising:

receiving a request from a user to create an active tag;

providing a configuration information template to the user in response to the request;

receiving configuration information for the active tag, wherein the configuration information is provided by the user in the configuration information template;

causing the display of the active tag to a plurality of users; and upon selection of the active tag, performing an action based upon the configuration information for the active tag;

wherein the configuration information is accessible by at least one other user, wherein the configuration information includes at least one macro recorded by the user, and wherein the action performed is determined based at least upon the recorded at least one macro.

67. A computer-implemented method for data processing, comprising:

receiving a request from a user to create an active tag;

providing a configuration information template to the user in response to the request;

receiving configuration information for the active tag, wherein the configuration information is provided by the user in the configuration information template;

causing the display of the active tag to a plurality of users; and upon selection of the active tag, performing an action based upon the configuration information for the active tag;

wherein the configuration information is accessible by at least one other user, wherein the configuration information includes computer code, and wherein the action performed is determined based at least upon the computer code.

68. A computer-implemented data processing system, comprising:

a collection of active tags from a community of users, wherein each active tag is associated by a user with an object, and wherein each active tag causes an action to be performed; and a user interface for accessing at least one active tag in the collection;

wherein selection of an active tag in the collection causes the action of the active tag to be performed.

* * * * *